United States Patent
Uramichi

(10) Patent No.: US 6,786,550 B2
(45) Date of Patent: Sep. 7, 2004

(54) RECLINING DEVICE FOR A SEAT

(75) Inventor: Hideki Uramichi, Toyota (JP)

(73) Assignee: Araco Kabushiki Kaisha, Toyota (JP)

( * ) Notice: Subject to any disclaimer, the term of this patent is extended or adjusted under 35 U.S.C. 154(b) by 75 days.

(21) Appl. No.: 10/050,943

(22) Filed: Jan. 22, 2002

(65) Prior Publication Data

US 2002/0096923 A1 Jul. 25, 2002

(30) Foreign Application Priority Data

Jan. 23, 2001 (JP) ........................................ 2001-014748

(51) Int. Cl.$^7$ .............................................. B60N 2/02
(52) U.S. Cl. ...................................................... 297/366
(58) Field of Search ................................. 297/362, 366, 297/367, 373; 16/221, 235, 354

(56) References Cited

U.S. PATENT DOCUMENTS

| | | | |
|---|---|---|---|
| 5,681,086 A | | 10/1997 | Baloche |
| 5,749,626 A | * | 5/1998 | Yoshida |
| 6,024,410 A | * | 2/2000 | Yoshida |
| 6,318,805 B1 | * | 11/2001 | Asano |

FOREIGN PATENT DOCUMENTS

| | | |
|---|---|---|
| EP | 0 720 930 A1 | 7/1996 |
| EP | 0 754 589 A2 | 1/1997 |
| EP | 0 773 133 A2 | 5/1997 |
| EP | 0 878 345 A1 | 11/1998 |
| JP | 8-253063 | 10/1996 |
| TW | 304380 | 5/1997 |

\* cited by examiner

*Primary Examiner*—Milton Nelson, Jr.
(74) *Attorney, Agent, or Firm*—Oliff & Berridge, PLC

(57) ABSTRACT

A reclining device including a recess formed as a low-rigidity portion in a lateral portion of each of slide pawls which faces a lateral wall surface of a guide groove of a stationary disc (the lateral wall surface of a bearing wall portion). The stationary disc holds the slide pawls. If an enormous circumferential turning force is applied to the slide pawls from a ratchet, the recess functions as a point upon which a pawl body of each of the slide pawls is deflected in the direction in which the turning force is applied. As a result, the pawl body quickly sinks into the lateral wall surface of the bearing wall portion. Thus, the slide pawls are prevented from moving away from the ratchet.

28 Claims, 10 Drawing Sheets

RECLINING DEVICE FOR A SEAT

INCORPORATION BY REFERENCE

The disclosure of Japanese Patent Application No. 2001-14748 filed on Jan. 23, 2001 including the specification, drawings and abstract is incorporated herein by reference in its entirety.

BACKGROUND OF THE INVENTION

1. Field of Invention

The invention relates to a reclining device. More specifically, the invention relates to the fitting of a seat back and a seat cushion.

2. Description of Related Art

A reclining device of a certain type is disclosed, for example, in Japanese Patent Application Laid-Open No. 8-253063. This reclining device comprises a plurality of pawls each having outer teeth on the front end side, an annular ratchet having inner teeth on the inner periphery side, and a holder for holding the pawls such that they can move toward and away from the inner teeth of the ratchet. The reclining device further comprises a cam body that receives the pawls. The cam body presses the pawls forwards so that the pawls are brought into mesh with the ratchet and locked with respect thereto. Upon application of an arbitrary operational force, the cam body is activated and cancels the operation of pressing the pawls against the ratchet so that the pawls are removed from the ratchet and unlocked therefrom.

The reclining device of this type is designed to prevent the ratchet from rotating relative to the holder when the pawls are locked with respect to the ratchet and to allow the ratchet to rotate relative to the holder when the pawls are unlocked from the ratchet. The reclining device of this type is disposed between a rear end portion of a seat cushion and a lower end portion of a seat back, thus constituting a vehicular reclining seat. For example, the reclining device of this type is designed such that the seat back is longitudinally tiltably supported with respect to the seat cushion by mounting the ratchet on the lower end side of the seat back and the holder on the rear end side of the seat cushion.

If a vehicle employing the vehicular reclining seat encounters an accident, an enormous load is applied to the seat back backwards or forwards from a passenger sitting on the seat cushion. That is, if the vehicle encounters a rear-end collision, the passenger sitting on the seat cushion collides against the seat back with an enormous impact so that the seat back is exposed to an enormous load and urged to tilt backwards. If the vehicle encounters a frontal collision, the passenger sitting on the seat cushion is exposed to an enormous ejective force to be on the verge of being thrown forwards. A seat belt for counterbalancing the enormous ejective force applies an enormous load to the seat back and urges the seat back to tilt forwards. Such an enormous load applied to the seat back directly acts on the reclining device for supporting the seat back with respect to the seat cushion. Such an enormous load applied to the reclining device acts in such a manner to bring the pawls out of mesh with the ratchet and may make it impossible for the reclining seat to support the seat back.

Hence, the reclining device constituting the vehicular reclining seat is required to sufficiently endure an enormous load that is applied to the seat back if the vehicle encounters an accident or the like. The reclining device is also required to have such a high durability. To meet such requirements, the reclining device is generally increased in size and robustness with a view to ensuring that the pawls are more securely in mesh with the ratchet. However, the adoption of such measures inevitably leads to an increase in the weight and cost of the reclining device.

To eliminate such a problem, the reclining device proposed by the aforementioned publication is designed such that an impact protrusion portion protruding toward each lateral wall surface of the guide groove of the holder is formed in a circumferential lateral face at the front end of a corresponding one of the pawls. Upon application of an enormous circumferential load from the side of the seat back, the impact protrusion portion of each of the pawls sinks into a corresponding one of the lateral wall surfaces of the guide groove of the holder due to a circumferential movement of the pawl resulting from an enormous circumferential operational force (turning force) applied to the ratchet. The reclining device proposed by the aforementioned publication employs a meshing-state holding means for causing each of the pawls to sink into a corresponding one of the lateral wall surfaces of the guide groove of the holder to prevent the pawls from retreating from the ratchet and to securely maintain the pawls in mesh with the ratchet.

SUMMARY OF THE INVENTION

A reclining device according to one exemplary aspect of the invention comprises pawls, a ratchet, a holder, and a cam body. Each of the pawls has first teeth formed in an end portion thereof, first and second leg portions extending in a direction opposite to the first teeth and formed in an end portion on the other side of the end portion where the first teeth are formed, and a low-rigidity portion formed in at least one of the first and second leg portions and demonstrating a lower rigidity than the other portions of the first and second leg portions. The ratchet has second teeth that mesh with the first teeth and can turn within a range where the second teeth are formed so that the first and second teeth can mesh with each other locally variably. The holder has a guide groove that abuts on and holds a lateral face of each of the pawls so that the pawl slidably moves toward and away from the second teeth of the ratchet. The cam body bears at least one of the first and second leg portions of each of the pawls and presses the first teeth of the pawl toward the ratchet so that the first teeth of the pawl are brought into mesh with the second teeth of the ratchet and that the holder and the ratchet are prevented from rotating relative to each other. The cam body brings the first teeth of the pawl out of mesh with the second teeth of the ratchet so that the holder and the ratchet are allowed to rotate relative to each other.

BRIEF DESCRIPTION OF THE DRAWINGS

The above mentioned features, advantages, and technical industries significant of this invention would be better understood by reading and following the detail description preferred embodiments of the invention, when considered in connection with the accompany drawings, in which.

DETAILED DESCRIPTION OF PREFERRED EMBODIMENTS

Figure 1:
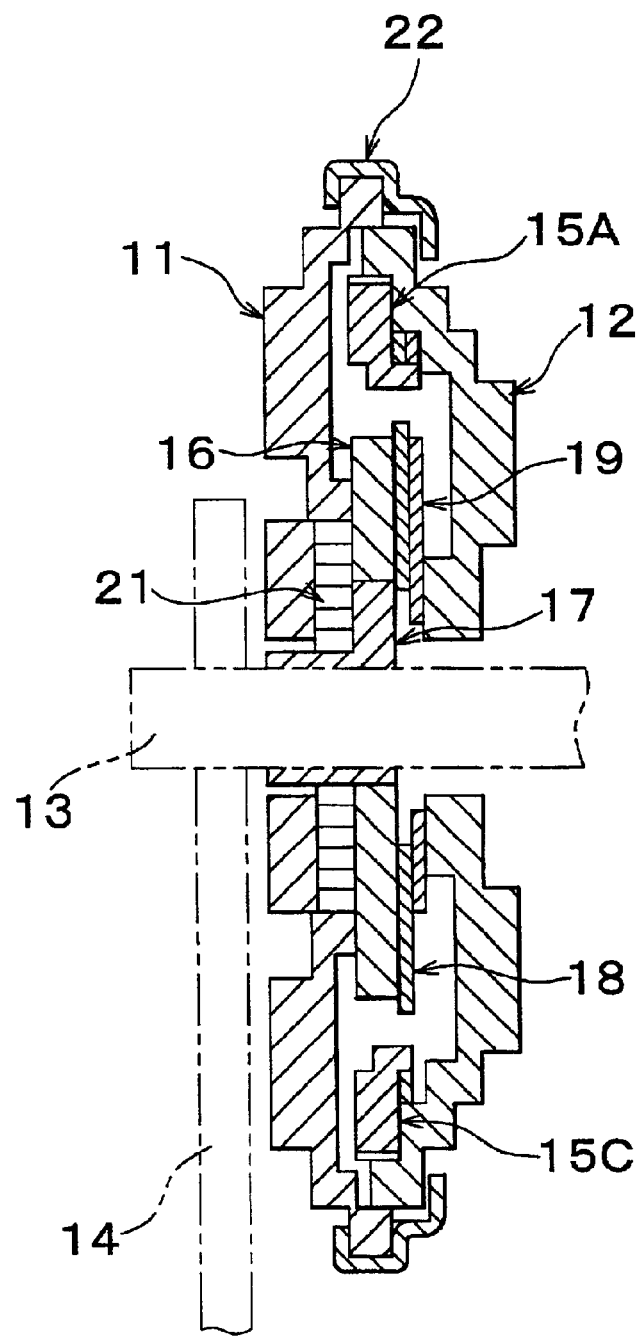
FIG. 1 is a longitudinal sectional view of a reclining device according to one example of the invention.
Figure 2:
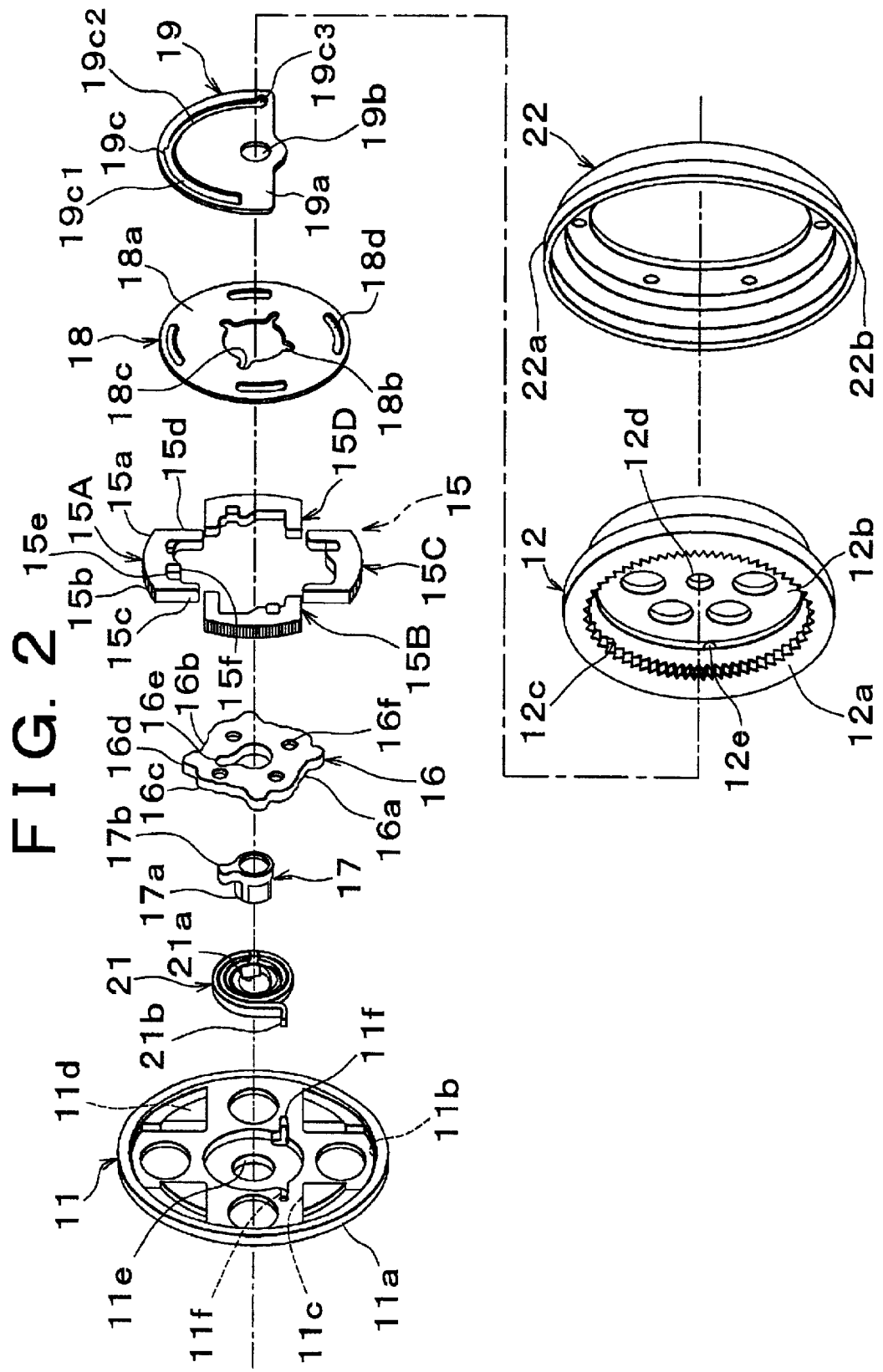
FIG. 2 is an exploded perspective view showing how component members of the reclining device are arranged.
Figure 3:
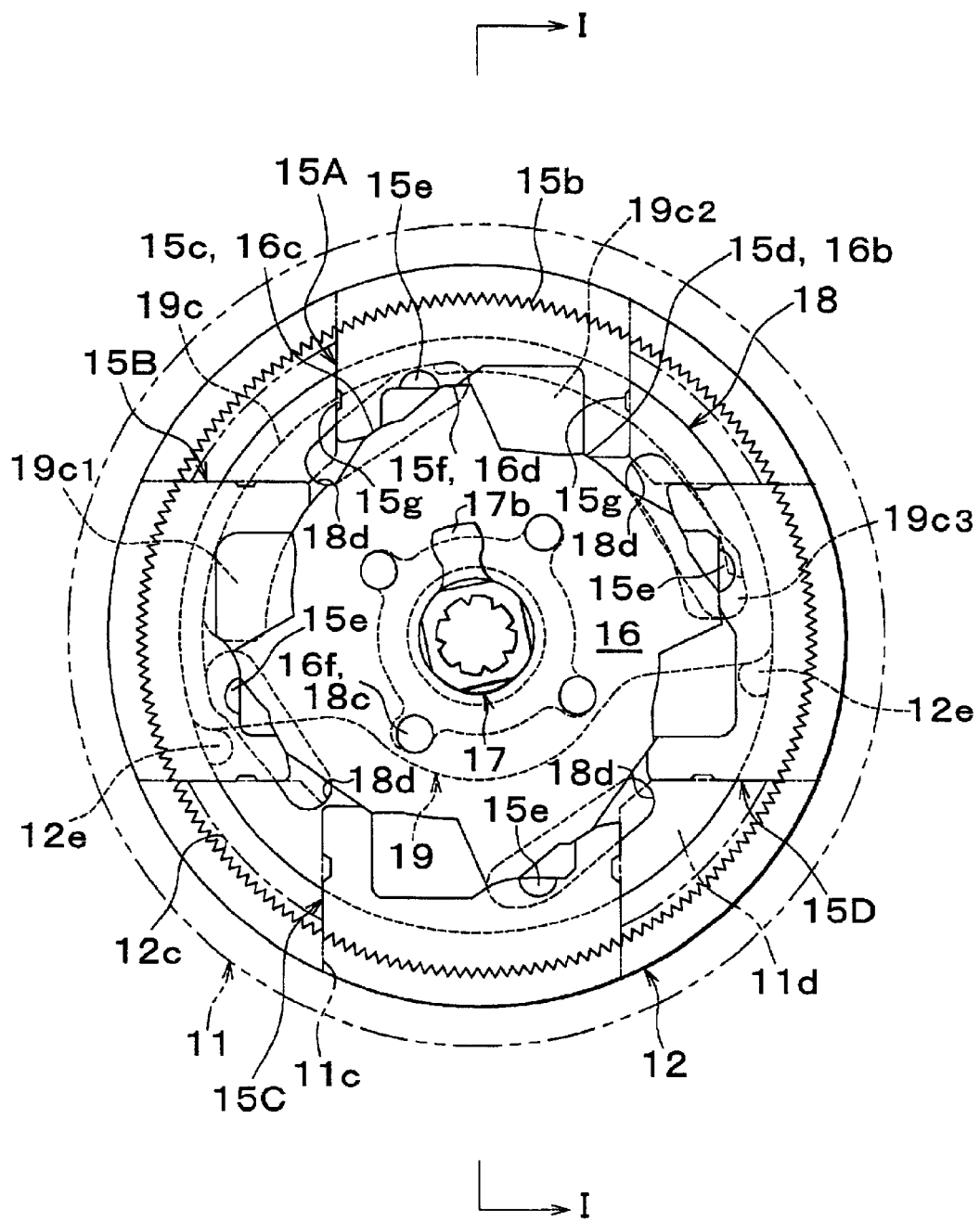
FIG. 3 is a front view of the reclining device that has been removed of some of the component members and that is in a state where slide pawls are in mesh with a ratchet.
Figure 4:
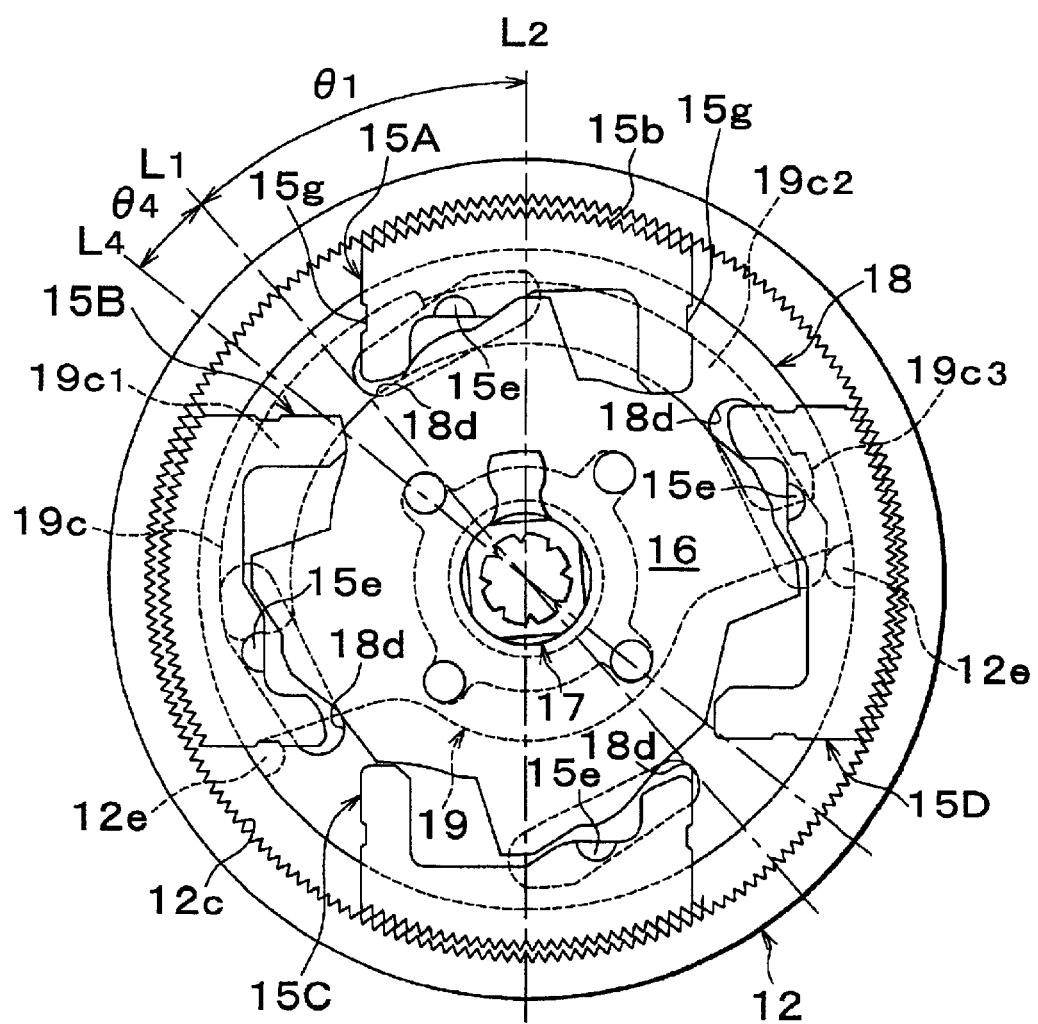
FIG. 4 is a front view of the reclining device that has been removed of some of the component members and that is in a state where the slide pawls are out of mesh with the ratchet.

Hereinafter, the invention will be described with reference to the drawings. FIG. 1 is a longitudinal sectional view of a reclining device 1 according to one example of the invention, and corresponds to a section-indicating line I—I in FIG. 3. FIG. 2 is an exploded perspective view of the reclining device 1. FIGS. 3 and 4 are front views of the reclining device 1 that has been removed of some of its component members. The reclining device 1 is designed for a vehicular reclining seat, and is identical in basic construction with a reclining device disclosed in Japanese Patent Application No. 2000-313961, which is a related application of the present applicant.

The reclining device 1 is composed of a stationary disc 11, a movable disc 12, a support shaft 13, a control lever 14, four slide pawls 15 (15A, 15B, 15C, 15D), a rotating cam 16, a control arm 17, a working plate 18, an unlock plate 19, a spiral spring 21, and a set plate 22. In this construction, the stationary disc 11 corresponds to a holder of the invention. The movable disc 12 is provided with a ratchet of the invention. The rotating cam 16 and the working plate 18 function as a cam body of the invention.

While the stationary disc 11 is mounted to a vehicular seat on the side of a seat cushion thereof, the movable disc 12 is mounted to the vehicular seat on the side of a seat back thereof The stationary disc 11 and the movable disc 12 are fitted to each other in a face-to-face manner. An outer peripheral edge portion of the set plate 22 that has been fitted from the side of the movable disc 12 is caulked, whereby the stationary disc 11 and the movable disc 12 are integrally connected with each other. As will be described later, the slide pawls 15, the rotating cam 16, the control arm 17, the working plate 18, the unlock plate 19, and the spiral spring 21 are accommodated in an accommodation space portion defined by the stationary disc 11 and the movable disc 12. The support shaft 13 penetrates the control arm 17, and the support shaft 13 and the control arm 17 are connected to transmit a torque to each other. The control lever 14 is mounted to the support shaft 13 at an outer end portion thereof.

As shown in FIGS. 2 and 3, the stationary disc 11 constituting the reclining device 1 has a stepped circular recess 11b formed inside a disc body 11a. A guide groove 11c, which intersects cruciformly and extends lengthwise and widthwise, is formed in the circular recess 11b. The guide groove 11c is formed in such a manner as to be much deeper than the circular recess 11b. In the guide groove 11c, each of four outer corner portions of the intersecting portion constitutes a corresponding one of bearing wall portions 11d assumes a generally triangular shape. Each bearing wall portion 11d is as thick as the disc body 11a. A through-hole 11e and hanging grooves 11f are formed in the circular recess 11b at a central portion thereof.

As shown in FIG. 2, the movable disc 12 has a stepped circular recess 12b formed inside a disc body 12a. Inner teeth are formed along the entire inner peripheral face of an annular portion, which is an outer large-diameter portion of the circular recess 12b. The annular portion is formed in a ratchet 12c. The disc body 12a is dimensioned in such a manner as to be fitted snugly to the circular recess 11b of the stationary disc 11. A through-hole 12d, which faces the through-hole 11e of the stationary disc 11, is formed in the circular recess 12b at a central portion thereof. Furthermore, four engaging protrusion portions 12e are formed along the circumference of a center circle of the circular recess 12b at intervals of a certain distance.

Main constitutional parts of the slide pawls 15 (15A, 15B, 15C, 15D) are all identical in shape. The slide pawl 15A is different only in a specific function from the other pawls 15B, 15C, and 15D. Therefore, the following description of the slide pawls 15 (15A, 15B, 15C, 15D) will regard the slide pawl 15A as distinct from the slide pawls 15B, 15C, and 15D when it comes to the specific function of the slide pawl 15A. Otherwise, however, they will be comprehensively referred to as the slide pawls 15.

As shown in FIGS. 2 to 4, each of the slide pawls 15 has, at a generally arcuate apex portion of a slide pawl body 15a (radially outside when assembled), outer teeth 15b that can mesh with the ratchet 12c of the movable disc 12. The slide pawl 15 has a pair of left and right leg portions 15c, 15d, which extend from the rear end on the side opposite to the outer teeth 15b of the pawl body 15a (radially inside when assembled). Furthermore, the outer teeth 15b of the pawl body 15a are designed to mesh with the ratchet 12c of the movable disc 12. Furthermore, a cam pin 15e, which is in the shape of a semicolumn and which protrudes toward the later-described working plate 18 when the reclining device 1 is assembled, is formed in the rear end portion of the pawl body 15a in a region between the leg portions 15c, 15d. It is to be noted herein that the cam pin 15e of the slide pawl 15A is formed to be slightly longer than those of the other slide pawls 15.

The pawl body 15a of each of the slide pawls 15 corresponds to the apex portion of each of the pawls of the invention. The rotating cam 16, which will be described later, bears the leg portions 15c, 15d. The leg portion 15c, which is on the side of a locking direction, is shorter than the leg portion 15d, which is on the side of an unlocking direction. Front end faces of the leg portions 15c, 15d are inclined in such a manner as to extend inwardly. The rotating cam 16 bears a bearing portion 15f, which is formed in an end face region between both the leg portions 15c, 15d in the rear end portion of the pawl body 15a. Later-described bearing cam portions of the rotating cam 16 bear the leg portions 15c, 15d and the bearing portion 15f.

A recess 15g is formed in an outer lateral face of each of the leg portions 15c, 15d. The recess 15g constitutes a low-rigidity portion of each of the leg portions 15c, 15d of each of the slide pawls 15. The recess 15g opens facing a lateral wall surface of a corresponding one of the bearing wall portions 11d of the stationary disc 11. The recess 15g is a spot on which a stress acting on a corresponding one of the slide pawls 15 circumferentially centers.

The rotating cam 16 is a generally circular plate. As shown in FIGS. 2 to 4, the rotating cam 16 has four cam sets arranged circumferentially along an outer peripheral edge of the cam body 16a at equal intervals. Each cam set is composed of a first bearing cam portion 16b, a second bearing cam portion 16c, and a third bearing cam portion 16d. The bearing cam portion 16b is greater in radial height than the bearing cam portion 16c, which is greater in radial height than the bearing cam portion 16d.

Further, a fitting hole 16e, which is generally identical in shape with the later-described control arm 17 and to which the control arm 17 can be fitted, is formed in the cam body 16a at a central portion thereof. Four engaging protrusion portions 16f are formed at intervals of a certain distance along the circumference of a circle stretching around the center of rotation of the cam body 16a. When the reclining device 1 is assembled, the engaging protrusion portions 16f protrude toward the later-described working plate 18.

As shown in FIGS. 2 to 4, the control arm 17 has a cylindrical body 17a, which is provided with an engaging arm portion 17b that protrudes outwardly. The control arm 17 is generally identical in shape with the fitting hole 16e of the rotating cam 16. The cylindrical body 17a has an inner hole that is formed like a spline.

The working plate 18 assumes a circular shape. As shown in FIG. 2, the working plate 18 has a plate body 18a in which a circular through-hole 18b is formed at a central portion thereof. Four engaging holes 18c, which are arranged circumferentially at intervals of a certain distance, are formed along an inner peripheral edge of the through-hole 18b. Four cam grooves 18d, which are arranged circumferentially at intervals of a certain distance, are formed in the plate body 18a on the side of an outer periphery thereof. The cam grooves 18d assume a generally arcuate shape. That is, each of the cam grooves 18d gently extends from one end thereof to the center and reaches the other end thereof.

As shown in FIGS. 2 to 4, the unlock plate 19 is a generally semicircular fan-shaped plate. A through-hole 19b is formed in a main portion of a plate body 19a. An arcuate long hole 19c is formed on the side of an outer peripheral edge of the unlock plate 19 in such a manner as to extend along the outer peripheral edge. The long hole 19c has a stepped hole composed of a large-width hole portion 19c1, a small-width hole portion 19c2, and a large-width hole portion 19c3, which are arranged in this order in the left-to-right direction in the drawings. The long hole 19c is located facing corresponding ones of the cam grooves 18d of the working plate 18.

The spiral spring 21 has a predetermined number of turns. As shown in FIG. 2, an inner end portion 21a of the spiral spring 21 is wound rectangularly, and an outer end portion 21b of the spiral spring 21 protrudes outwardly. The inner end portion 21a is dimensioned in such a manner as to be fitted snugly onto the cylindrical body 17a of the control arm 17. The outer end portion 21b is formed in such a manner as to be hung on one of the hanging grooves 1 if of the stationary disc 11.

As shown in FIG. 2, the set plate 22 has a tubular portion 22b extending along an outer peripheral edge portion of an annular plate body 22a. The set plate 22 is dimensioned such that it can be fitted onto the outer peripheral side of the stationary disc 11 from the side of the movable disc 12 when the stationary disc 11 and the movable disc 12 are fitted together. As shown in FIG. 1, when the set plate 22 is fitted on the movable disc 12 and the stationary disc 11, the front end portion of the tubular portion 22b is caulked to connect the stationary disc 11 and the movable disc 12 with each other.

These component members are assembled, for example, according to the following procedure to constitute the reclining device 1 shown in FIG. 1. That is, the support shaft 13 is passed through the through-hole 11e of the stationary disc 11. That is, the spiral spring 21, the control arm 17, the rotating cam 16, the slide pawls 15, the working plate 18, the unlock plate 19, and the movable disc 12 are assembled in this order. Then the support shaft 13 passes through the through-hole 11e and the support shaft 13 connects with an inner cylinder of the cylindrical body 17a of the control arm 17. Then, the set plate 22 is fitted onto the outer periphery of the stationary disc 11 from the side of the movable disc 12. Finally, the front end portion of the tubular portion 22b of the set plate 22 is caulked as shown in FIG. 1. Thus, the reclining device 1 is completed.

In this state of assembly, the outer end portion 21b of the spiral spring 21 is hung on one of the hanging grooves 11f of the stationary disc 11. The control arm 17 is inserted into the spiral spring 21. The inner end 21a, the shape of which is approximately square, of the spiral spring 21 is fixed with a periphery of the cylindrical body 17a, the shape of which is approximately square corresponding to the shape of the inner end 21a of the spiral spring 21. The rotating cam 16 is fitted on the control arm 17. An engaging arm 17b of the control arm 17 is fitted in the fitting hole 16e of the rotating cam 16. The slide pawls 15 are disposed such that they can slide radially into the guide groove 11c of the stationary disc 11. Each of the bearing wall portions 11d prevents a corresponding one of the slide pawls 15 from moving circumferentially. The slide pawls 15 are arranged in a crisscross manner on the side of the outer periphery of the rotating cam 16.

The leg portion 15d, the leg portion 15c, and the bearing portion 15f of each of the slide pawls 15 respectively abut on the first bearing cam portion 16b, the second bearing cam portion 16c, and the third bearing cam portion 16d of a corresponding one of the cam sets of the rotating cam 16. In this state, as shown in FIG. 3, the outer teeth 15b of each of the slide pawls 15 are in mesh with a corresponding opposed portion of the ratchet 12c of the movable disc 12.

In this state of assembly, the working plate 18 is located facing the rotating cam 16, with the slide pawls 15 interposed therebetween. Each of the engaging protrusion portions 16f of the rotating cam 16 is in engagement with a corresponding one of the engaging holes 18c of the working plate 18. Thus, the working plate 18 is connected with the rotating cam 16 and can rotate together therewith. The cam pin 15e of each of the slide pawls 15 faces a corresponding one of the cam grooves 18d of the working plate 18. Thus, the cam pin 15e of each of the slide pawls 15 and the corresponding one of the cam grooves 18d of the working plate 18 constitute a cam mechanism for causing radial sliding movements of the slide pawl 15.

In this state of assembly, the working plate 18 is located facing the rotating cam 16 and the slide pawls 15. Each of the engaging protrusion portions 16f of the rotating cam 16 is in engagement with a corresponding one of the engaging holes 18c of the working plate 18. Thus, the working plate 18 is connected with the rotating cam 16 and can rotate together therewith. The cam pin 15e of each of the slide pawls 15 faces a corresponding one of the cam grooves 18d of the working plate 18. Thus, the cam pin 15e of each of the slide pawls 15 and the corresponding one of the cam grooves 18d of the working plate 18 constitute a cam mechanism for causing radial sliding movements of the slide pawl 15.

Next, the operation of the reclining device 1 will be described with reference to FIGS. 3 to 8. FIGS. 3 and 4 are front views of the reclining device 1 that has been removed of the stationary disc 11, the support shaft 13, and the spiral spring 21. FIG. 3 shows a state where the slide pawls 15 are in mesh with the ratchet 12c of the movable disc 12 so that the seat back (not shown) is locked with respect to the seat cushion. FIG. 4 shows a state where the slide pawls 15 have been retreated from the ratchet 12c by turning the control lever 14 so that the slide pawls 15 are out of mesh with the ratchet 12c.

FIGS. 5 to 8 show how the movable disc 12, the ratchet 12c, the slide pawls 15, and the unlock plate 19 are operationally related to one another during operation of the reclining device 1. FIGS. 5 to 8 are front views of the reclining device 1 that has been removed of the component members other than the movable disc 12, the ratchet 12c, the slide pawls 15, and the unlock plate 19.

As shown in FIG. 3, the reclining device 1 is designed such that, when the control lever 14 is out of operation, the bearing portion 15f of each of the slide pawls 15 abut on the bearing cam portions 16d of the rotating cam 16. The leg portions 15c and 15d of each of the slide pawls 15 respectively are situated near the bearing cam portions 16c and 16b of a corresponding one of the cam sets of the rotating cam 16. Each of the slide pawls 15 mesh with a corresponding opposite portion of the ratchet 12c of the movable disc 12. An elastic force of the spiral spring 21 is applied to the rotating cam 16 counter clockwise in the drawings via the control arm 17, so that the rotating cam 16 is maintained at such an angle as to allow abutment on the slide pawls 15. As a result, the slide pawls 15 maintain the mesh with the ratchet 12c. This state of mesh ensures that the movable disc 12 is locked with respect to the stationary disc 11 in the reclining device 1 and thus creates a state where the seat back is locked with respect to the seat cushion. Consequently, the state of mesh prevents the seat back from being tilted longitudinally with respect to the seat cushion.

When the reclining device 1 is in a state of mesh as shown in FIG. 3, the seat back stands upright with respect to the seat cushion at a foremost tilt position (first-stage lock position). The cam pin 15e of the slide pawl 15A, which is the only one connected with the unlock plate 19, is located at a border step portion which is in the large-width hole portion 19c1 of the long hole 19c of the unlock plate 19 and which constitutes a border with the small-width hole portion 19c2.

When the reclining device 1 is in this state of mesh, the control lever 14 is turned to unlock the seat back from the seat cushion. Then, the control arm 17 rotates clockwise in FIG. 3, and causes the rotating cam 16 to rotate clockwise by a predetermined amount. As a result, the bearing portion 15f of each of the slide pawls 15 are brought out of abutment on the bearing cam portions 16d of the rotating cam 16. The leg portions 15d and 15c of each of the slide pawls 15 are respectively removed from the bearing cam portions 16b and 16c of a corresponding one of the cam sets of the rotating cam 16. Thus, the rotating cam 16 is released from the slide pawls 15. The rotating cam 16 frees the slide pawls 15 to move radially inwardly. The working plate 18 rotates together with the rotating cam 16. Herein, the working plate 18 radially inwardly presses the cam pin 15e of each of the slide pawls 15 with a radially outside inner peripheral face of a corresponding one of the cam grooves 18d, thus causing sliding movements of the slide pawl 15. Then, the working plate 18 removes the slide pawls 15 from the ratchet 12c, thus bringing the slide pawls 15 out of mesh with the ratchet 12c. FIG. 4 shows a state where the slide pawls 15 have been removed from the ratchet 12c and brought out of mesh therewith.

In the state where the slide pawls 15 have been brought out of mesh with the ratchet 12c, the movable disc 12 can rotate relative to the stationary disc 11 both clockwise and counterclockwise. The seat back has been unlocked from the seat cushion. Hence, the seat back can be tilted longitudinally with respect to the seat cushion. More specifically, the seat back can be tilted backwards until it becomes substantially horizontal, and can be tilted forwards until it is folded down onto the seat cushion in a substantially horizontal posture.

The reclining device 1 is designed such that, if the seat back is tilted backwards with respect to the seat cushion, the movable disc 12 assuming the position shown in FIG. 3, turns clockwise. After the movable disc 12 has turned by a predetermined amount, the operation of turning the control lever 14 is canceled. Then, the support shaft 13 and the control arm 17 turn counterclockwise due to an elastic force of the spiral spring 21. Then, the rotating cam 16 resumes rotating counterclockwise, moves the slide pawls 15 toward the ratchet 12c, and brings them into mesh therewith. Thus, the movable disc 12 is prevented from rotating relative to the stationary disc 11, while the seat back is locked with respect to the seat cushion at a desired tilt angle and maintained in this state.

The reclining device 1 is designed such that, while the movable disc 12 turns, the cam pin 15e of the slide pawl 15A moves within the long hole 19c of the unlock plate 19. While the cam pin 15e moves within the large-width hole portion 19c1 of the long hole 19c, the rotating cam 16 moves the slide pawls 15 toward the ratchet 12c and brings them into mesh therewith. The slide pawls 15 can be brought out of mesh with the ratchet 12c by turning the control lever 14. Accordingly, the tilt angle of the seat back with respect to the seat cushion can be adjusted arbitrarily. In the meantime, the movable disc 12, the ratchet 12c, the slide pawls 15, and the unlock plate 19 shift from the state shown in FIG. 5 to the state shown in FIG. 6.

Figure 5:
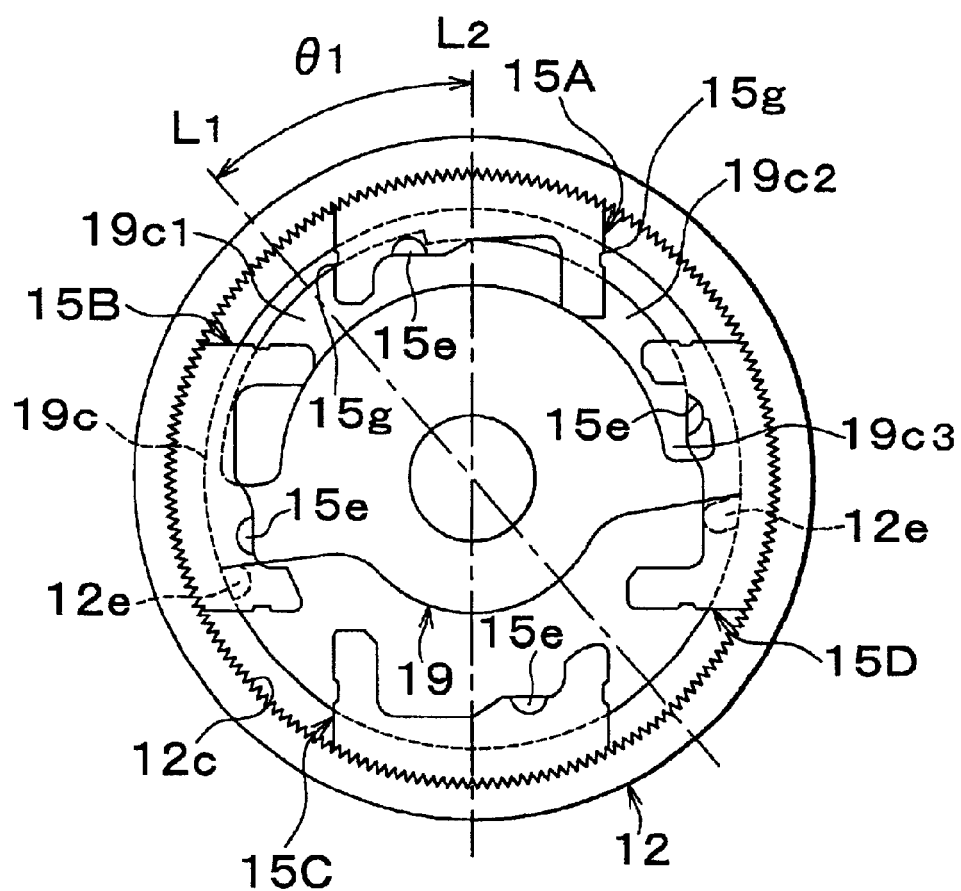
FIG. 5 is a front view of the reclining device in which a movable disc, the slide pawls, the ratchet, and an unlock plate assume one operational state.
Figure 6:
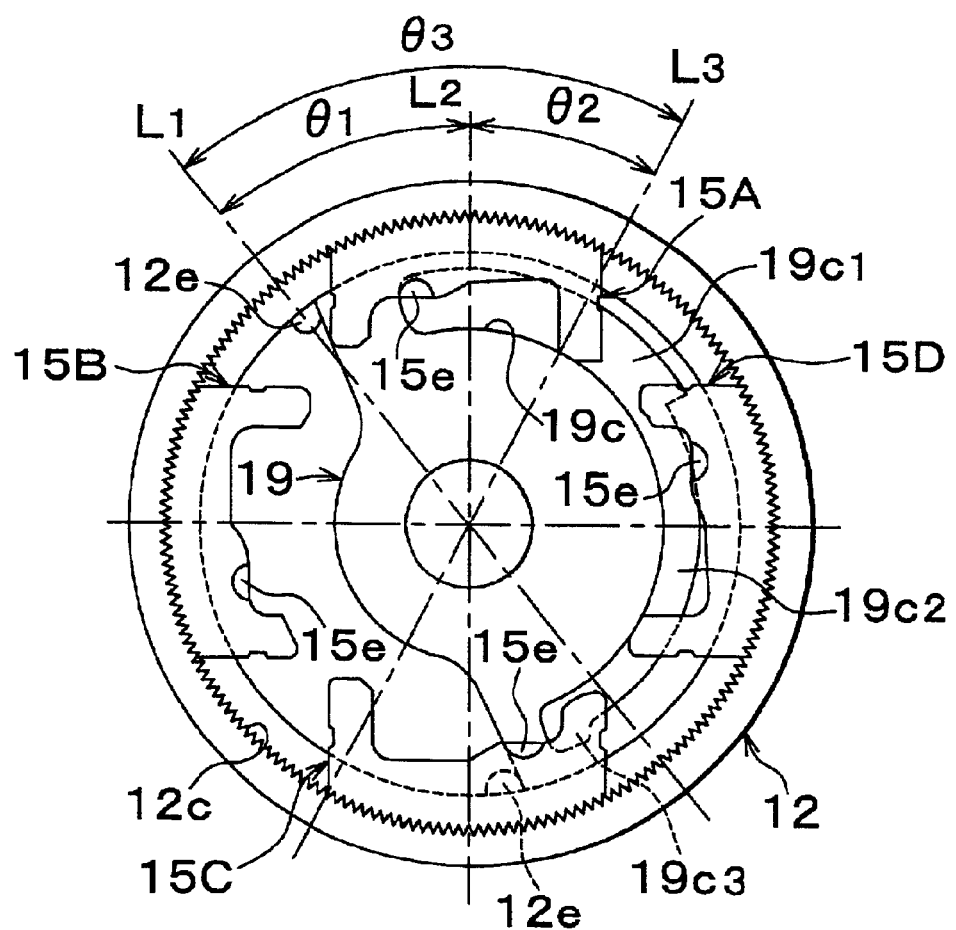
FIG. 6 is a front view of the reclining device that assumes another operational state.

FIG. 5 is a drawing corresponding to FIG. 3. A base line L1 in FIG. 5 indicates the first-stage lock position of the seat back. A base line L3 in FIG. 6 indicates a last-stage lock position of the seat back. The reclining device 1 is designed such that the tilt angle of the seat back can be adjusted within an angular range θ3 that is composed of an angular range θ1 defined by the base line L1 and a base line L2 and an angular range θ2 defined by the base lines L2, L3. The seat back is designed to stand substantially upright when it is at the first-stage lock position corresponding to the base line L1.

If the seat back is folded down onto the seat cushion in a substantially horizontal posture when the reclining device 1 is in the state of mesh shown in FIG. 3, the control lever 14 is turned to rotate the rotating cam 16 and the working plate 18 clockwise by a predetermined amount. Thus, the slide pawls 15 are removed from the ratchet 12c and brought out of mesh therewith. Then, the movable disc 12 becomes capable of rotating with respect to the stationary disc 11 and makes it possible to turn the seat back forwards with respect to the seat cushion. If the seat back is thus turned forwards, the movable disc 12 turns the unlock plate 19 counterclockwise in an integral manner. Then, as shown in FIG. 4, the cam pin 15e of the slide pawl 15A moves from the large-width hole portion 19c1 to the small-width hole portion 19c2 in the long hole 19c of the unlock plate 19. If the seat back is turned further forwards, the cam pin 15e proceeds in the small-width hole portion 19c2 and reaches the large-width hole portion 19c3, which is the furthest end portion of the long hole 19c.

If the cam pin 15e of the slide pawl 15A moves from the large-width hole portion 19c1 to the small-width hole portion 19c2 in the long hole 19c of the unlock plate 19, the cam pin 15e becomes engaged with the small-width hole portion 19c2, so that the slide pawl 15A is maintained apart from the ratchet 12c. The leg portion 15c of the slide pawl 15A abuts on the bearing cam portion 16c of a corresponding one of the cam sets of the rotating cam 16, whereby the rotating cam 16 is prevented from rotating counterclockwise. Accordingly, the other slide pawls 15B, 15C, and 15D are also maintained apart from the ratchet 12c. Thus, even if the operation of turning the control lever 14 is canceled, all the slide pawls 15 can be maintained out of mesh with the ratchet 12c. This state is maintained as long as the cam pin 15e is located in the small-width hole portion 19c2 of the long hole 19c. In the meantime, the movable disc 12 is free to move with respect to the stationary disc 11, whereby the seat back can be tilted forwards until it is folded down onto the seat cushion in a substantially horizontal posture. In the meantime, the movable disc 12, the ratchet 12c, the slide pawls 15, and the unlock plate 19 shift from the state shown in FIG. 5 to the state shown in FIG. 7 and then assume the state shown in FIG. 8.

Figure 7:
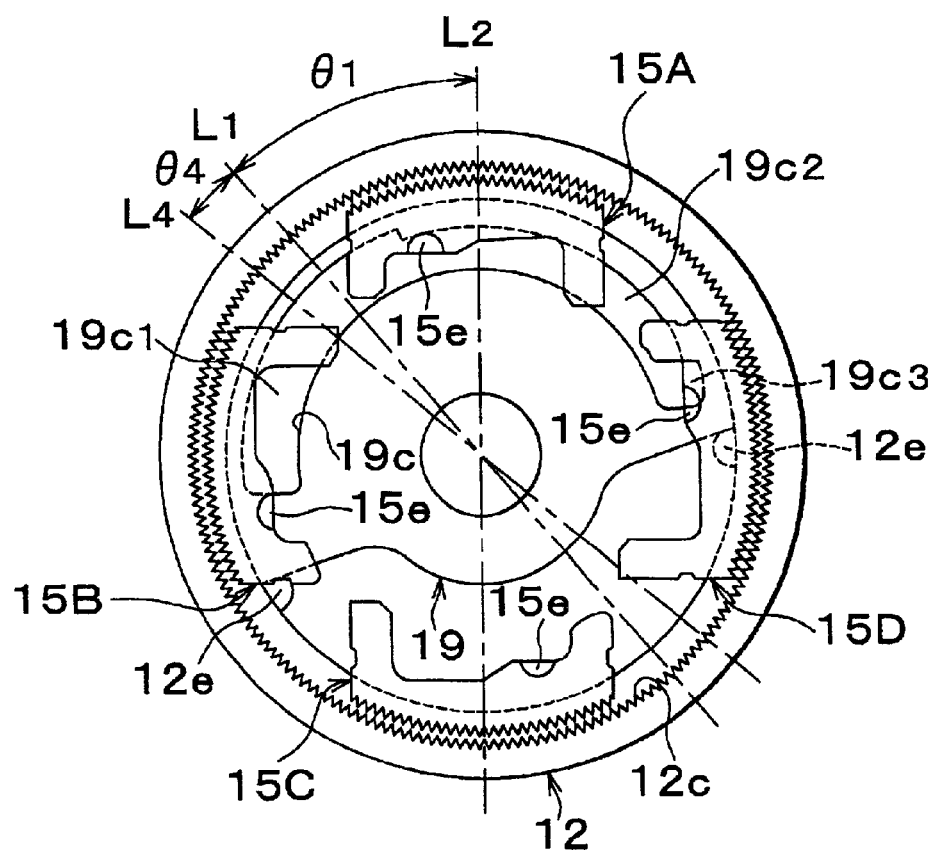
FIG. 7 is a front view of the reclining device that assumes still another operational state.

FIG. 7 is a drawing corresponding to FIG. 4. A base line L4 in FIG. 7 indicates a turning position of the seat back upon transition of the cam pin 15e of the slide pawl 15A from the large-width hole portion 19c1 to the small-width hole portion 19c2 of the unlock plate 19. As soon as the seat back turns by an angle θ4 from the base line L1 to the base line L4, the cam pin 15e of the slide pawl 15A moves into the small-width hole portion 19c2 of the unlock plate 19. A base line L5 in FIG. 8 indicates a turning position of the seat back that has been folded down furthest forwards. The seat back is designed to be folded down in a substantially horizontal posture as soon as it turns by an angle θ5 (including the angle θ4) from the base line L1 to the base line L5.

Figure 8:
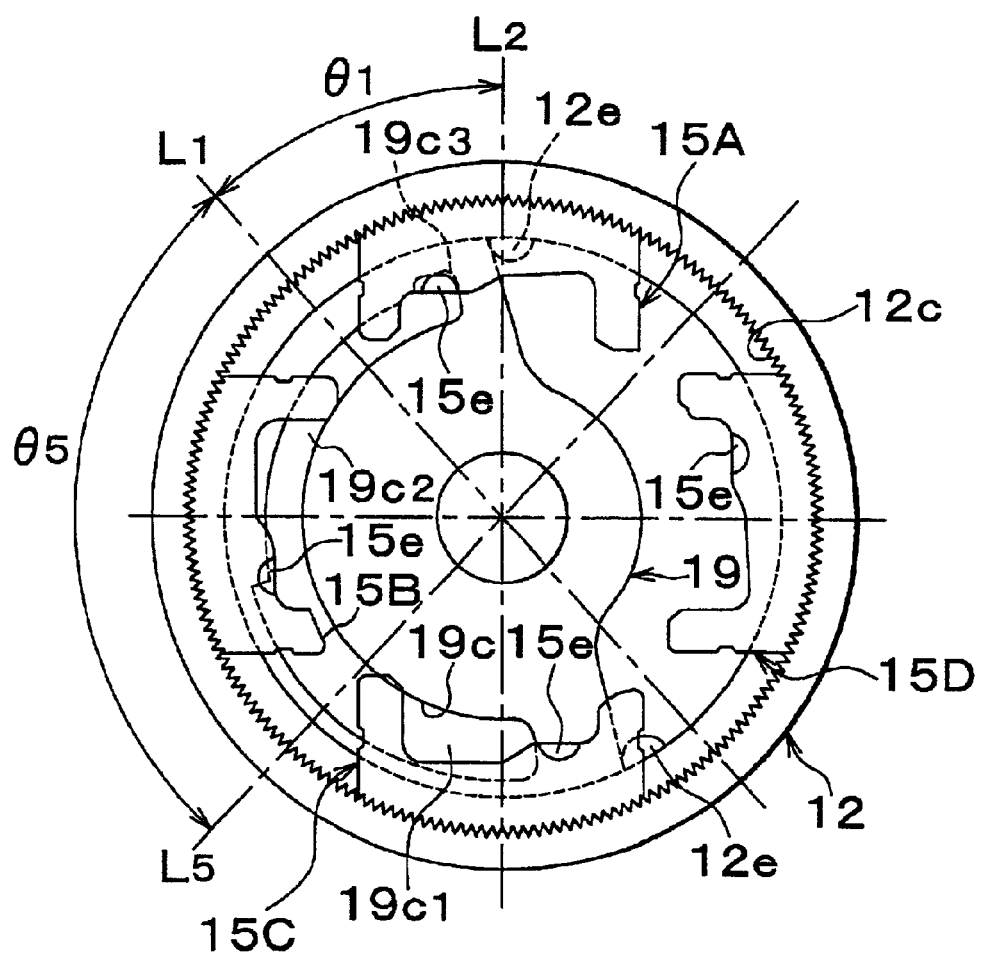
FIG. 8 is a front view of the reclining device that assumes still another operational state.

If the seat back is tilted forwards and folded down onto the seat cushion in a substantially horizontal posture, the cam pin 15e of the slide pawl 15A moves from the small-width hole portion 19c2 to the large-width hole portion 19c3 as shown in FIG. 8. The large-width hole portion 19c3 is the furthest end portion of the long hole 19c of the unlock plate 19. If the cam pin 15e of the slide pawl 15A moves into the large-width hole portion 19c3, the cam pin 15e is disengaged from the small-width hole portion 19c2. Thus, the slide pawl 15A becomes capable of moving toward the ratchet 12c. Then, the rotating cam 16 and the working plate 18 resume turning counterclockwise due to an elastic force of the spiral spring 21, move the slide pawls 15 toward the ratchet 12c, and bring them into mesh therewith. Thus, the movable disc 12 is locked with respect to the stationary disc 11. Consequently, the seat back is locked while being folded down on the seat cushion in a substantially horizontal posture.

To cause the seat back that has been tilted forwards and folded down to return to the upright position, the control lever 14 is turned to remove the slide pawls 15 assuming the state of mesh shown in FIG. 8 from the ratchet 12c and bring them out of mesh therewith. Then, the seat back is turned backwards by a predetermined amount. The operation of turning the control lever 14 is canceled to tilt the seat back further backwards. When the seat back is turned backwards, the cam pin 15e of the slide pawl 15A has already moved into the small-width hole portion 19c2 of the long hole 19c of the unlock plate 19. Therefore, the movable disc 12 is free to move with respect to the stationary disc 11 and allows the seat back to turn backwards.

The reclining device 1 is designed such that, if the seat back reaches the base line L1 via the base line L4, the cam pin 15e of the slide pawl 15A moves into the large-width hole portion 19c1 of the unlock plate 19 and that the cam pin 15e of each of the slide pawls 15 is then disengaged. Then, the slide pawls 15 move toward the ratchet 12c due to an elastic force of the spiral spring 21 and come into mesh with the ratchet 12c. Thus, the seat back is locked with respect to the seat cushion at the first-stage lock position defined by the base line L1, and is maintained in a standing posture at a predetermined tilt angle.

Thus, the reclining device 1 is designed such that, if the unlock plate 19 maintains the slide pawl 15A as a specific one of the slide pawls apart in such a direction as to bring it out of mesh with the ratchet 12c, the slide pawl 15A activates the working plate 18 and the rotating cam 16 to maintain the slide pawls 15 apart in such a direction as to bring them out of mesh with the ratchet 12c and thus to establish a state where the slide pawls 15 are out of mesh with the ratchet 12c.

Hence, only if the unlock plate 19 maintains one of the slide pawls 15, namely, the slide pawl 15A apart, when it becomes possible to establish a free zone for each of the slide pawls 15. Such a free zone can be established even if the angular range for bringing the slide pawl 15A out of mesh with the ratchet 12c and the angular range for bringing the adjacent slide pawls 15B, 15D into mesh with the ratchet 12c overlap with each other in a plan view.

The reclining device 1 is designed to constitute a vehicular reclining seat by being mounted to a hinge portion that connects the seat cushion with the seat back. As will be described below, the reclining device 1 is designed to suit the vehicular reclining seat.

That is, as shown in FIGS. 5 to 8, the reclining device 1 is designed (1) to establish a lock state where the slide pawls 15 can mesh with the ratchet 12c on the side where the angle of the seat back with respect to the seat cushion is larger than a predetermined angle (on the side of the base lines L2, L3 with respect to the base line L1), (2) to establish an unlock state where the slide pawls 15 cannot mesh with the ratchet 12c on the side where the angle of the seat back with respect to the seat cushion is smaller than the predetermined angle (on the side of the base lines L4, L5 with respect to the base line L1), and (3) to establish a lock state where the slide pawls 15 are in mesh with the ratchet 12c at the position where the angle of the seat back with respect to the seat cushion assumes its minimum value (at the position indicated by the base line L5).

Accordingly, the vehicular reclining seat employing the reclining device 1 can establish a lock state if the seat back is folded down toward the seat cushion until the angle formed therebetween is minimized, namely, if the seat back assumes the turning position indicated by the base line L5 and becomes substantially horizontal. Thus, as long as the seat back is locked in a substantially horizontal posture, unstable vibration of the seat back can be prevented even if the vehicle is exposed to external vibration while traveling. Because a back portion of the seat back is locked in a substantially horizontal posture and prevented from vibrating unstably, it is possible to use the back portion of the seat back as a table.

Furthermore, the reclining device 1 is advantageous in that such a simple structure in which the movable disc 12 is provided with the engaging protrusion portions 12e makes it possible to integrate the unlock plate 19 with the movable disc 12 having the ratchet 12c in the turning direction. Also, the reclining device 1 is advantageous in that the free zone of the reclining device 1, which differs depending on the type of the vehicle, can be provided easily by a means for suitably changing the unlock plate 19. It is to be noted herein that the engaging protrusion portions 12e of the movable disc 12 assume a suitable shape. The movable disc 12 may be provided with a protrusion portion or a hanging portion corresponding to the engaging protrusion portions 12e, and the unlock plate 19 may be provided with a hanging portion or a protrusion portion on which the protrusion portion or the hanging portion of the movable disc 12 is hung. The protrusion portion may be hung on the hanging portion so that the unlock plate 19 is integrally connected with the movable disc 12 in the turning direction.

The reclining device 1 demonstrates various operations and effects as described above by being mounted to constitute a vehicular reclining seat. In particular, if a vehicle equipped with the reclining seat encounters an accident, the reclining device 1 operates as follows to securely support the seat back with respect to the seat cushion.

Figure 9:
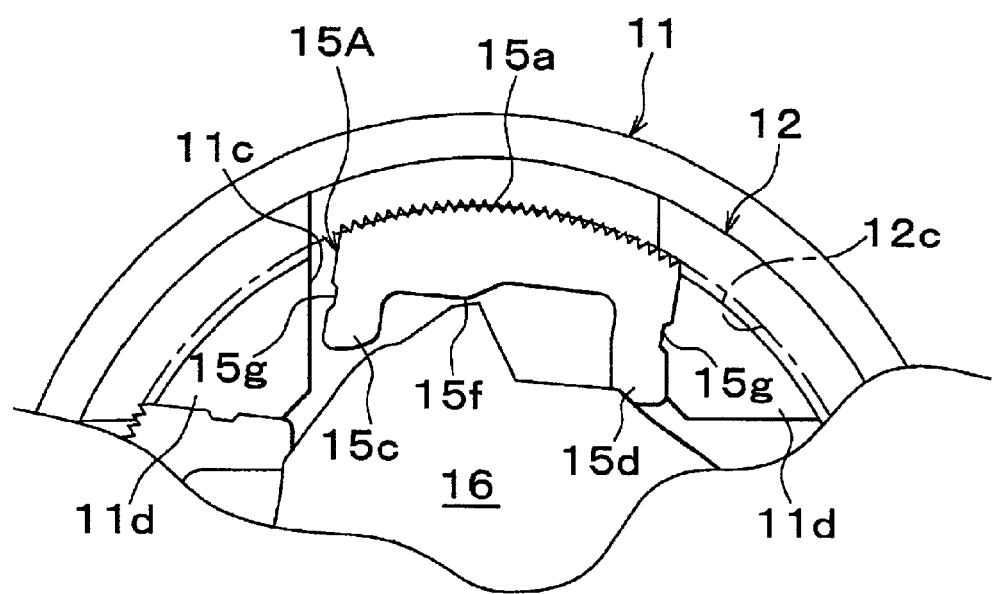
FIG. 9 is an explanatory view of part of a stationary disc, one of the pawls, and part of a cam body in a state where the pawl has been deflected due to application of an enormous load during collision of a vehicle.

If the vehicle encounters a rear-end collision, a passenger sitting on the seat cushion is exposed to an enormous impact and collides against the seat back. Consequently, the seat back is exposed to an enormous load and urged to tilt backwards. This load is applied to the reclining device 1 connecting the seat cushion with the seat back as a circumferential turning force. This turning force is applied to the ratchet 12c via the movable disc 12 in such a manner as to cause clockwise rotation. If the slide pawls 15 are in mesh with the ratchet 12c, this turning force is transmitted from the ratchet 12c to the slide pawls 15. The turning force transmitted to each of the slide pawls 15 centers on the recess 15g, which is the most fragile portion of the leg portion 15d extending from a clockwise lateral end portion of that slide pawl 15. Thus, the leg portion 15d is buckled at the recess 15g. The pawl body 15a is deflected upon the recess 15g of the leg portion 15d thus buckled in a direction in which the turning force is applied, that is, clockwise in the drawings. As a result, as shown in FIG. 9, part of the pawl body 15a sinks into the lateral wall of the bearing wall portion 11d of the stationary disc 11. These sequential events, namely, the buckling of the leg portion 15d, the deflection of the pawl body 15a, and the sinking of the bearing wall portion 11d into the lateral wall (the lateral wall of the guide groove 11c) occur quickly upon a corresponding one of the recesses 15g formed in the lateral face of the slide pawl 15 shown in FIG. 9.

If the vehicle encounters a frontal collision, the turning force is applied counterclockwise in FIG. 9, so that the pawl body 15a is deflected upon the recess 15g formed in the leg portion 15c.

As described above, if an enormous circumferential turning force applied to the ratchet 12c acts on the slide pawls 15 in the reclining device 1, part of the pawl body 15a of each of the slide pawls 15 sinks into the lateral wall of a corresponding one of the bearing wall portions 11d before that slide pawl 15 is brought out of mesh with the ratchet 12c. Thus, the slide pawls 15 are securely maintained in mesh with the ratchet 12c despite an enormous load applied from the side of the seat back.

Accordingly, the vehicular reclining seat employing the reclining device of the invention ensures that the seat back is securely supported with respect to the seat cushion and reliably supports a passenger sitting on the seat cushion even if an enormous load is applied to the seat back due to a collision of the vehicle.

Figure 10:
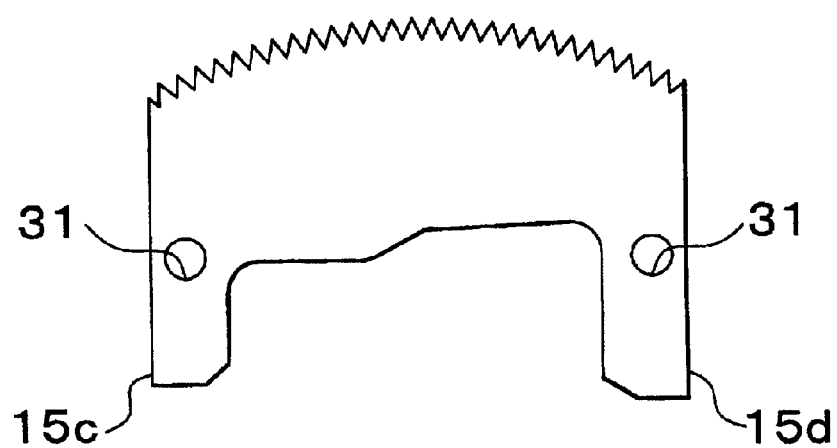
FIG. 10 is a front view of a slide pawl according to another embodiment of the invention.
Figure 11:
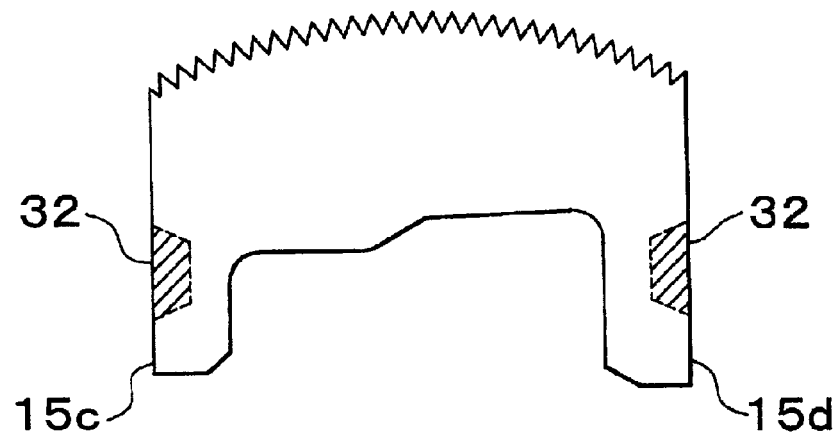
FIG. 11 is a front view of a slide pawl according to still another embodiment of the invention.

Although the recesses 15g are formed in the leg portions 15c, 15d as the low-rigidity portions according to one exemplary aspect of the invention, it is also possible to constitute low-rigidity portions by boring a hole 31 in each of the leg portions 15c, 15d in a region close to the end thereof as shown in FIG. 10. Alternatively, as shown in FIG. 11, it is also possible to fill those portions which correspond to the recesses 15g with a low-rigidity material 32, which demonstrates a lower rigidity than a material from which the other portions are made. This also makes it possible to buckle each of the slide pawls 15 upon a corresponding one of the low-rigidity portions. This construction ensures that there is no elevation formed in a surface of abutment between each of the slide pawls 15 and the guide groove 11c, thus making it possible to cause normal sliding movements of the slide pawls 15 to occur smoothly.

While the invention has been described with reference to preferred embodiments thereof, it is to be understood that the invention is not limited to preferred embodiments or constructions. To the contrary, the invention is intended to cover various modifications and equivalent arrangements. In addition, while the various elements of the preferred embodiment are shown in various combinations and configurations, which are exemplary, other combinations and configurations, including more, less or only a single element, are also within the spirit and scope of the invention.

What is claimed is:

1. A reclining device, comprising:
a plurality of pawls, each of which has first teeth formed in a first end portion thereof, first and second leg portions extending in a direction opposite to the first teeth and formed in a second end portion on the other side of the first end portion where the first teeth are formed and a low-rigidity portion formed in each of the first and second leg portions and demonstrating a lower rigidity than the other portions of the first and second leg portions, wherein the low-rigidity portion is formed at a root of each of the leg portions of each of the pawls;
a ratchet which has second teeth that mesh with the first teeth and which can turn within a range where the second teeth are formed so that the first and second teeth can mesh with each other locally and variably;
a holder which has a guide groove that abuts on and holds a lateral face of each of the pawls so that the pawls slidably move toward and away from the second teeth of the ratchet; and
a cam body which bears on at least one of the first and second leg portions of each of the pawls and presses the first teeth of the pawl toward the ratchet so that the first teeth of the pawl are brought into mesh with the second teeth of the ratchet in order to prevent the holder and the ratchet from rotating relative to each other and which brings the first teeth of the pawl out of mesh with the second teeth of the ratchet so that the holder and the ratchet are allowed to rotate relative to each other.

2. The reclining device according to claim 1, wherein the low-rigidity portion is formed in at least one of the first and second leg portions in a region with a reduced cross-sectional area.

3. The reclining device according to claim 2, wherein the low-rigidity portion is a recess formed in the leg portion in a face opposed to the direction in which the ratchet can turn.

4. The reclining device according to claim 2, wherein the low-rigidity portion has a hole formed inside a lateral wall of the leg portion and extending perpendicularly to the direction in which the ratchet can turn.

5. The reclining device according to claim 1, wherein the low-rigidity portion is made from a material demonstrating a lower rigidity than a material from which the other portions of each of the pawls are made.

6. A reclining device, comprising:

a plurality of pawls, each of which has first teeth formed in a first end portion thereof, first and second leg portions extending in a direction opposite to the first teeth and formed in a second end portion on the other side of the first end portion where the first teeth are formed and a low-rigidity portion formed in each of the first and second leg portions and demonstrating a lower rigidity than the other portions of the first and second leg portions;

a ratchet which has second teeth that mesh with the first teeth and which can turn within a range where the second teeth are formed so that the first and second teeth can mesh with each other locally and variably;

a holder which has a guide groove that abuts on and holds a lateral face of each of the pawls so that the pawls slidably move toward and away from the second teeth of the ratchet; and a cam body which bears on at least one of the first and second leg portions of each of the pawls and presses the first teeth of the pawl toward the ratchet so that the first teeth of the pawl are brought into mesh with the second teeth of the ratchet in order to prevent the holder and the ratchet from rotating relative to each other and which brings the first teeth of the pawl out of mesh with the second teeth of the ratchet so that the holder and the ratchet are allowed to rotate relative to each other, wherein if a stress is applied to the pawls via the ratchet in the direction in which the ratchet can turn when the pawls are in mesh with the ratchet such that the low-rigidity portion on the side of the stress buckles, each of the pawls are deflected upon the low-rigidity portion on the side of a turning direction such that the first teeth turn toward the ratchet.

7. The reclining device according to claim 6, wherein part of the deflected pawl sinks into a lateral face of the guide groove that is on the side of a direction in which the pawl moves and that abuts on the pawl.

8. The reclining device according to claim 6, wherein part of the first teeth remain meshed with part of the second teeth after the pawls are deflected.

9. The reclining device according to claim 6, wherein when the pawls are deflected upon the low-rigidity portion, the first teeth keep meshing with the ratchet.

10. The reclining device according to claim 9, wherein the low-rigidity portion is a recess.

11. A reclining device, comprising:

a plurality of pawls, each of which has first teeth formed in a first end portion thereof, first and second leg portions extending in a direction opposite to the first teeth and formed in a second end portion on the other side of the first end portion where the first teeth are formed and a low-rigidity portion formed in at least one of the first and second leg portions and demonstrating a lower rigidity than the other portions of the first and second leg portions, wherein the low-rigidity portion is formed at a root of each of the leg portions of each of the pawls;

a ratchet which has second teeth that mesh with the first teeth and which can turn within a range where the second teeth are formed so that the first and second teeth can mesh with each other locally and variably;

a holder which has a guide groove that abuts on and holds a lateral face of each of the pawls so that the pawls slidably move toward and away from the second teeth of the ratchet, wherein the low-rigidity portion is formed to face a lateral wall of the guide groove of the holder; and a cam body which bears on at least one of the first and second leg portions of each of the pawls and presses the first teeth of the pawl toward the ratchet so that the first teeth of the pawl are brought into mesh with the second teeth of the ratchet in order to prevent the holder and the ratchet from rotating relative to each other and which brings the first teeth of the pawl out of mesh with the second teeth of the ratchet so that the holder and the ratchet are allowed to rotate relative to each other.

12. The reclining device according to claim 11, wherein the low-rigidity portion is formed in at least one of the first and second leg portions in a region with a reduced cross-sectional area.

13. The reclining device according to claim 12, wherein the low-rigidity portion is a recess formed in the leg portion in a face opposed to the direction in which the ratchet can turn.

14. The reclining device according to claim 12, wherein the low-rigidity portion has a hole formed inside a lateral wall of the leg portion and extending perpendicularly to the direction in which the ratchet can turn.

15. The reclining device according to claim 11, wherein the low-rigidity portion is made from a material demonstrating a lower rigidity than a material from which the other portions of each of the pawls are made.

16. A reclining device, comprising:

a plurality of pawls, each of which has first teeth formed in a first end portion thereof, first and second leg portions extending in a direction opposite to the first teeth and formed in a second end portion on the other side of the first end portion where the first teeth are formed and a low-rigidity portion formed in at least one of the first and second leg portions and demonstrating a lower rigidity than the other portions of the first and second leg portions;

a ratchet which has second teeth that mesh with the first teeth and which can turn within a range where the second teeth are formed so that the first and second teeth can mesh with each other locally and variably;

a holder which has a guide groove that abuts on and holds a lateral face of each of the pawls so that the pawls slidably move toward and away from the second teeth of the ratchet, wherein the low-rigidity portion is formed to face a lateral wall of the guide groove of the holder; and a cam body which bears on at least one of the first and second leg portions of each of the pawls and presses the first teeth of the pawl toward the ratchet so that the first teeth of the pawl are brought into mesh with the second teeth of the ratchet in order to prevent the holder and the ratchet from rotating relative to each other and which brings the first teeth of the pawl out of mesh with the second teeth of the ratchet so that the holder and the ratchet are allowed to rotate relative to each other, wherein if a stress is applied to the pawls via the ratchet in the direction in which the ratchet can turn when the pawls are in mesh with the ratchet such that the low-rigidity portion on the side of the stress buckles, each of the pawls are deflected upon the low-rigidity portion on the side of a turning direction such that the first teeth turn toward the ratchet.

17. The reclining device according to claim 16, wherein part of the deflected pawl sinks into a lateral face of the guide groove that is on the side of a direction in which the pawl moves and that abuts on the pawl.

18. The reclining device according to claim 16, wherein part of the first teeth remain meshed with part of the second teeth after the pawls are deflected.

19. The reclining device according to claim 16, wherein when the pawls are deflected upon the low-rigidity portion, the first teeth keep meshing with the ratchet.

20. The reclining device according to claim 19, wherein the low-rigidity portion is a recess.

21. The reclining device according to claim 6, wherein the low-rigidity portion is formed in at least one of the first and second leg portions in a region with a reduced cross-sectional area.

22. The reclining device according to claim 21, wherein the low-rigidity portion is a recess formed in the leg portion in a face opposed to the direction in which the ratchet can turn.

23. The reclining device according to claim 21, wherein the low-rigidity portion has a hole formed inside a lateral wall of the leg portion and extending perpendicularly to the direction in which the ratchet can turn.

24. The reclining device according to claim 6, wherein the low-rigidity portion is made from a material demonstrating a lower rigidity than a material from which the other portions of each of the pawls are made.

25. The reclining device according to claim 16, wherein the low-rigidity portion is formed in at least one of the first and second leg portions in a region with a reduced cross-sectional area.

26. The reclining device according to claim 25, wherein the low-rigidity portion is a recess formed in the leg portion in a face opposed to the direction in which the ratchet can turn.

27. The reclining device according to claim 25, wherein the low-rigidity portion has a hole formed inside a lateral wall of the leg portion and extending perpendicularly to the direction in which the ratchet can turn.

28. The reclining device according to claim 16, wherein the low-rigidity portion is made from a material demonstrating a lower rigidity than a material from which the other portions of each of the pawls are made.

* * * * *